United States Patent
Sato et al.

(10) Patent No.: US 9,853,329 B2
(45) Date of Patent: Dec. 26, 2017

(54) METHOD FOR PRODUCING AND APPARATUS FOR PRODUCING SECONDARY BATTERY

(75) Inventors: Hiroshi Sato, Tokyo (JP); Seiji Yamaura, Nagano (JP); Takuya Sakata, Tokyo (JP)

(73) Assignees: ELIIY POWER CO., LTD., Tokyo (JP); NAGANO AUTOMATION CO., LTD., Nagano (JP)

( * ) Notice: Subject to any disclaimer, the term of this patent is extended or adjusted under 35 U.S.C. 154(b) by 597 days.

(21) Appl. No.: 14/112,714

(22) PCT Filed: Apr. 18, 2011

(86) PCT No.: PCT/JP2011/059567
§ 371 (c)(1),
(2), (4) Date: Dec. 18, 2013

(87) PCT Pub. No.: WO2012/144008
PCT Pub. Date: Oct. 26, 2012

(65) Prior Publication Data
US 2014/0101928 A1    Apr. 17, 2014

(51) Int. Cl.
*H01M 10/0583*    (2010.01)
*H01M 10/04*    (2006.01)
*H01M 10/052*    (2010.01)

(52) U.S. Cl.
CPC ... *H01M 10/0583* (2013.01); *H01M 10/0404* (2013.01); *H01M 10/0459* (2013.01); *H01M 10/052* (2013.01); *Y02T 10/7011* (2013.01); *Y10T 29/49108* (2015.01); *Y10T 29/53135* (2015.01)

(58) Field of Classification Search
None
See application file for complete search history.

(56) References Cited

U.S. PATENT DOCUMENTS

| 2004/0154160 A1* | 8/2004 | Hong | H01M 10/0404 29/730 |
|---|---|---|---|
| 2009/0165936 A1* | 7/2009 | Sakata | B32B 38/1808 156/227 |

FOREIGN PATENT DOCUMENTS

| JP | 2004-022449 | 1/2004 |
|---|---|---|
| JP | 2009-140772 | 6/2009 |
| JP | 2009-140775 | 6/2009 |
| JP | 2009-158317 | 7/2009 |

* cited by examiner

*Primary Examiner* — Mark F Huff
*Assistant Examiner* — Zhongqing Wei
(74) *Attorney, Agent, or Firm* — Young & Thompson

(57) ABSTRACT

After a separator is brought into a tension-free state, a plurality of guide members are crossed in a horizontal direction between rows of the guide members to fold the separator or a superposed body zigzag. Positive electrode plates or negative electrode plates are inserted into the resulting furrows to produce a secondary battery.

21 Claims, 15 Drawing Sheets

(a)

(b)

(a)

(b)

(a)

(b)

(a)

(b)

METHOD FOR PRODUCING AND APPARATUS FOR PRODUCING SECONDARY BATTERY

TECHNICAL FIELD

This invention relates to a method for producing and an apparatus for producing a secondary battery for use in vehicles, electric equipment, etc.

BACKGROUND ART

A secondary battery such as a lithium ion secondary battery has an electrode plate group formed by superposing positive electrode plates and negative electrode plates alternately such that separators are interposed between the positive electrode plates and the negative electrode plates. As one of devices for producing such an electrode plate group, a zigzag stack type production device is available in which a continuous body of the separator is folded zigzag, the positive electrode plates and the negative electrode plates are inserted into the respective furrows of the zigzag-folded separator, and the resulting composite is crushed flat (see, for example, Patent Document 1).

PRIOR ART DOCUMENTS

Patent Documents

Patent Document 1: JP-A-2004-22449

SUMMARY OF THE INVENTION

Problems to be Solved by the Invention

Such a production device in a zigzag stack mode can improve the positional accuracy of the positive and negative electrode plates and the separator, and can shorten tact time, as compared with, for example, a stack mode manufacturing device in which positive electrode plates, negative electrode plates, and separators each shaped in the form of a sheet are alternately stacked such that each separator is interposed between the adjacent positive electrode plate and negative electrode plate. With the production of the electrode plate group, however, it is desired that the positional accuracy of the positive and negative electrodes and the separator be further improved and that the tact time be further shortened.

The manufacturing method described in Patent Document 1, for example, comprises holding a continuous separator between a pair of rollers, reciprocating the pair of rollers in a horizontal direction to fold the separator zigzag, and placing the positive and negative electrode plates alternately on the separator each time the pair of rollers makes a reciprocating motion. In this case, it is difficult to shorten the tact time markedly.

The present invention has been accomplished in the light of the above-mentioned circumstances. It is an object of the present invention to provide a method for producing and an apparatus for producing a secondary battery which can shorten the tact time and also increase the positional accuracy of the positive and negative electrodes and the separator.

Means for Solving the Problems

A first aspect of the present invention, designed to solve the above-described problems, lies in a method for producing a secondary battery, comprising: a zigzag folding step of pushing a separator by a plurality of guide members to fold the separator zigzag; a multilayer body formation step of inserting positive electrode plates and negative electrode plates into respective furrows of the zigzag-folded separator to form a multilayer body having the positive electrode plates and the negative electrode plates superposed alternately via the separator; a withdrawal step of withdrawing the guide members from inside the respective furrows of the separator; and a pressing step of pressing the multilayer body in a direction in which the positive electrode plates and the negative electrode plates are stacked, wherein the zigzag folding step is performed after the separator is brought into a tension-free state.

A second aspect of the present invention lies in a method for producing a secondary battery, comprising: a zigzag folding step of pushing a superposed body, which has a negative electrode plate sandwiched between two separators, by a plurality of guide members to fold the superposed body zigzag; a multilayer body formation step of inserting positive electrode plates into respective furrows of the zigzag-folded superposed body to form a multilayer body having the positive electrode plates and the negative electrode plate superposed alternately via the separators; a withdrawal step of withdrawing the guide members from inside the respective furrows of the superposed body; and a pressing step of pressing the multilayer body in a direction in which the positive electrode plates and the negative electrode plate are stacked, wherein the zigzag folding step is performed after the superposed body is brought into a tension-free state.

A third aspect of the present invention lies in the method for producing a secondary battery according to the first or second aspect, further comprising a separator arrangement step of arranging the plurality of guide members zigzag in a vertical direction, and disposing the separator or the superposed body between one row and another row of the guide members, wherein the zigzag folding step is performed by crossing the guide members in a horizontal direction between the rows.

A fourth aspect of the present invention lies in the method for producing a secondary battery according to the third aspect, wherein the separator arrangement step disposes the separator or the superposed body between the one row and the other row of the guide members, then brings the separator or the superposed body into a tension-free state, while contacting the guide members in each row with the separator or the superposed body to restrain movement of the separator or the superposed body.

A fifth aspect of the present invention lies in the method for producing a secondary battery according to any one of the first to fourth aspects, further comprising a cutting step of cutting the separator or the superposed body to a predetermined length.

A sixth aspect of the present invention lies in the method for producing a secondary battery according to the fifth aspect, wherein the cutting step is performed after the pressing step.

A seventh aspect of the present invention lies in the method for producing a secondary battery according to the fifth aspect, wherein the cutting step is performed before the zigzag folding step.

An eighth aspect of the present invention lies in the method for producing a secondary battery according to the seventh aspect, further comprising, before the cutting step, a paying-out step of paying out the separator or the superposed body of the predetermined length from a roll of the separator or the superposed body wound up, wherein the paying-out step and the cutting step are performed not later than the pressing step which is performed for producing an immediately preceding secondary battery.

A ninth aspect of the present invention lies in an apparatus for producing a secondary battery, comprising: zigzag folding means which has a plurality of guide members arranged zigzag in a vertical direction and which, when a separator is disposed between one row and another row of the guide members, crosses the guide members in a horizontal direction between the rows to fold the separator zigzag; electrode plate insertion means which has an electrode plate conveying member for positive electrode plates or negative electrode plates for placing thereon a predetermined number of positive electrode plates or negative electrode plates, and which moves the electrode plate conveying member for positive electrode plates or negative electrode plates into respective furrows of the separator to insert the positive electrode plates and the negative electrode plates into the respective furrows; and conveying means which holds and conveys the separator to the zigzag folding means and which, when the separator is to be folded zigzag, brings the separator into a tension-free state.

A tenth aspect of the present invention lies in an apparatus for producing a secondary battery, comprising: zigzag folding means which has a plurality of guide members arranged zigzag in a vertical direction and which, when a superposed body having a negative electrode plate sandwiched between two separators is disposed between one row and another row of the guide members, crosses the guide members in a horizontal direction between the rows to fold the superposed body zigzag; electrode plate insertion means which has an electrode plate conveying member for positive electrode plates for placing thereon a predetermined number of positive electrode plates, and which moves the electrode plate conveying member for positive electrode plates into respective furrows of the superposed body to insert the positive electrode plates into the respective furrows; and conveying means which holds and conveys the superposed body to the zigzag folding means and which, when the superposed body is to be folded zigzag, brings the superposed body into a tension-free state.

An eleventh aspect of the present invention lies in the apparatus for producing a secondary battery according to the ninth or tenth aspect, wherein the conveying means brings the separator or the superposed body cut to a predetermined length into a tension-free state when the separator or the superposed body is to be folded zigzag.

A twelfth aspect of the present invention lies in the apparatus for producing a secondary battery according to the eleventh aspect, further comprising supply means which includes a conveying system for conveying the separator or the superposed body, and a cutting unit for cutting the separator or the superposed body, and which supplies the separator or the superposed body of the predetermined length to the conveying means, wherein the conveying means conveys the separator or the superposed body of the predetermined length supplied from the supply means to the zigzag folding means.

Effects of the Invention

According to the present invention described above, the guide members can be moved at a relatively high speed, the furrows can be formed satisfactorily in the separator or the superposed body in a relatively short time, and an improvement in tact time can be achieved.

MODE FOR CARRYING OUT THE INVENTION

Modes for carrying out the present invention will be described by reference to the accompanying drawings.

Embodiment 1

Figure 1:
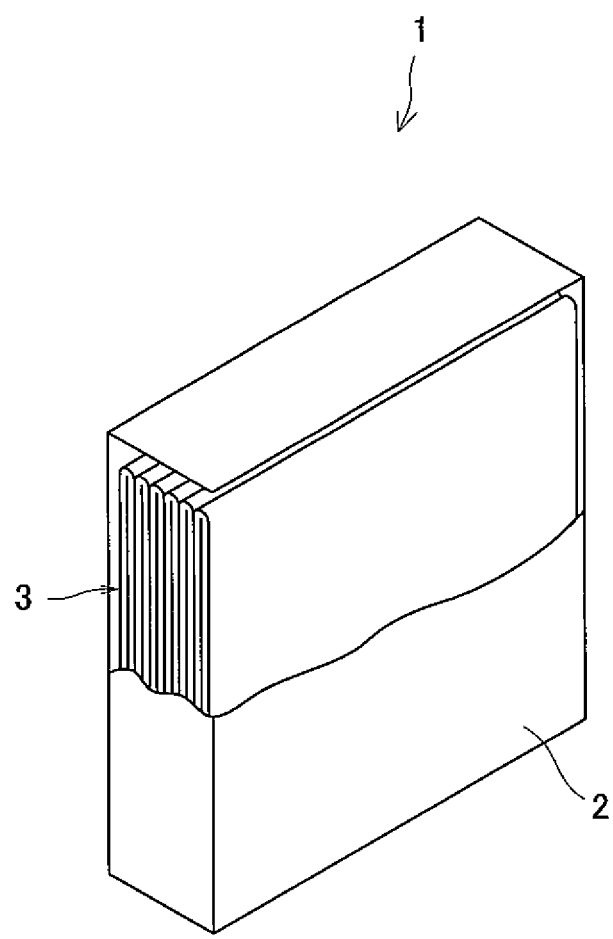
FIG. 1 is a perspective view showing the outline of a square battery accommodating an electrode plate group according to Embodiment 1.
Figure 2:
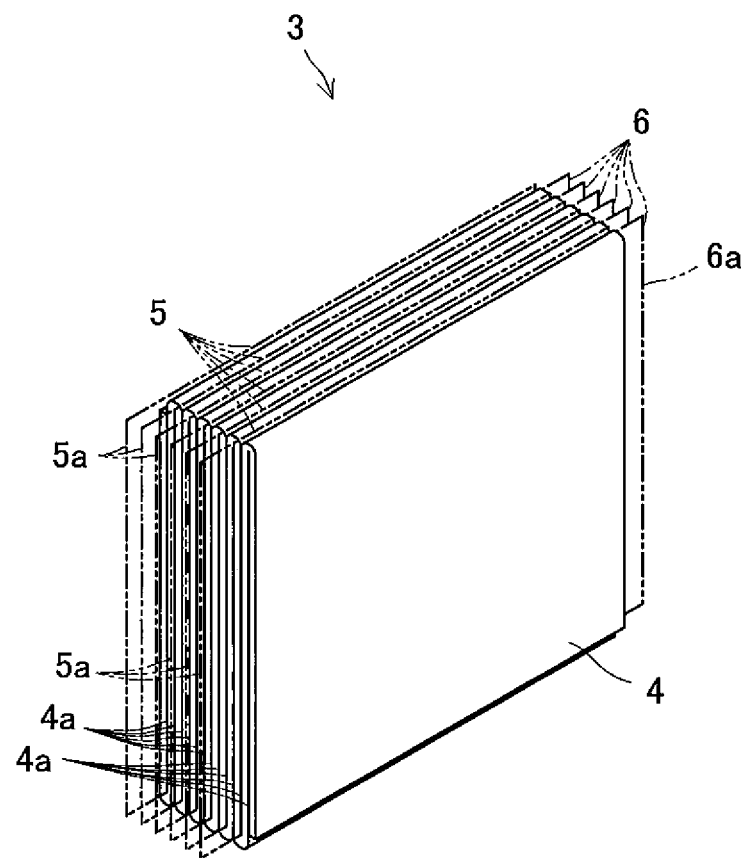
FIG. 2 is a perspective view showing the schematic configuration of the electrode plate group according to Embodiment 1.

As shown in FIGS. 1 and 2, a square battery (secondary battery) 1, which is a lithium ion secondary battery, has a square case 2, and an electrode plate group 3 is housed inside the square case 2. A positive electrode terminal and a negative electrode terminal (not shown) are provided at predetermined locations of the square case 2. The interior of the square case 2 is filled with an electrolyte comprising a lithium salt blended with an organic solvent.

The electrode plate group 3 includes a zigzag-folded separator 4, and positive electrode plates 5 and negative electrode plates 6 inserted alternately into the respective furrows 4a of the separator 4. The positive electrode plates 5 and the negative electrode plates 6 are alternately superposed such that the separator 4 is interposed between the adjacent positive electrode plate 5 and negative electrode plate 6, and the separator 4 is in a flat-folded state. The positive electrode plates 5 and the negative electrode plates 6 have lead parts 5a, 6a protruding from the separator 4 to sides opposite to each other, and the lead parts 5a, 6a of the respective electrodes are bundled, respectively. The lead parts 5a of the positive electrode plates 5 are connected to the positive electrode terminal, while the lead parts 6a of the negative electrode plates 6 are connected to the negative electrode terminal.

Figure 3:
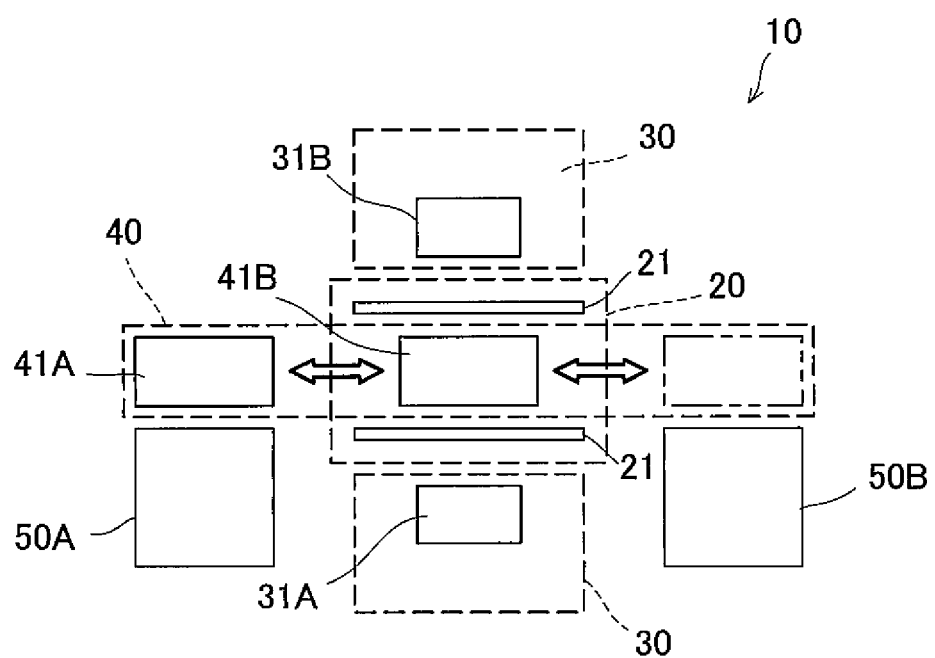
FIG. 3 is a block diagram showing the schematic configuration of an apparatus for producing the electrode plate group according to Embodiment 1.

A production apparatus 10 for producing the electrode plate group 3 of the above-mentioned configuration is equipped with at least zigzag folding means 20, electrode plate insertion means 30, conveying means 40, and supply means 50 (50A, 50B), as shown in FIG. 3.

Figure 4:
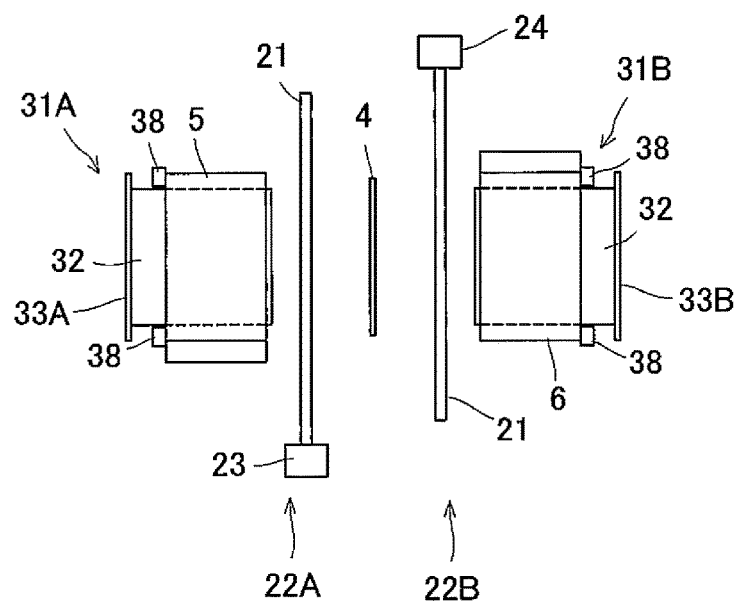
FIGS. 4(a), 4(b) are schematic views showing the apparatus for producing the electrode plate group according to Embodiment 1.
Figure 4:
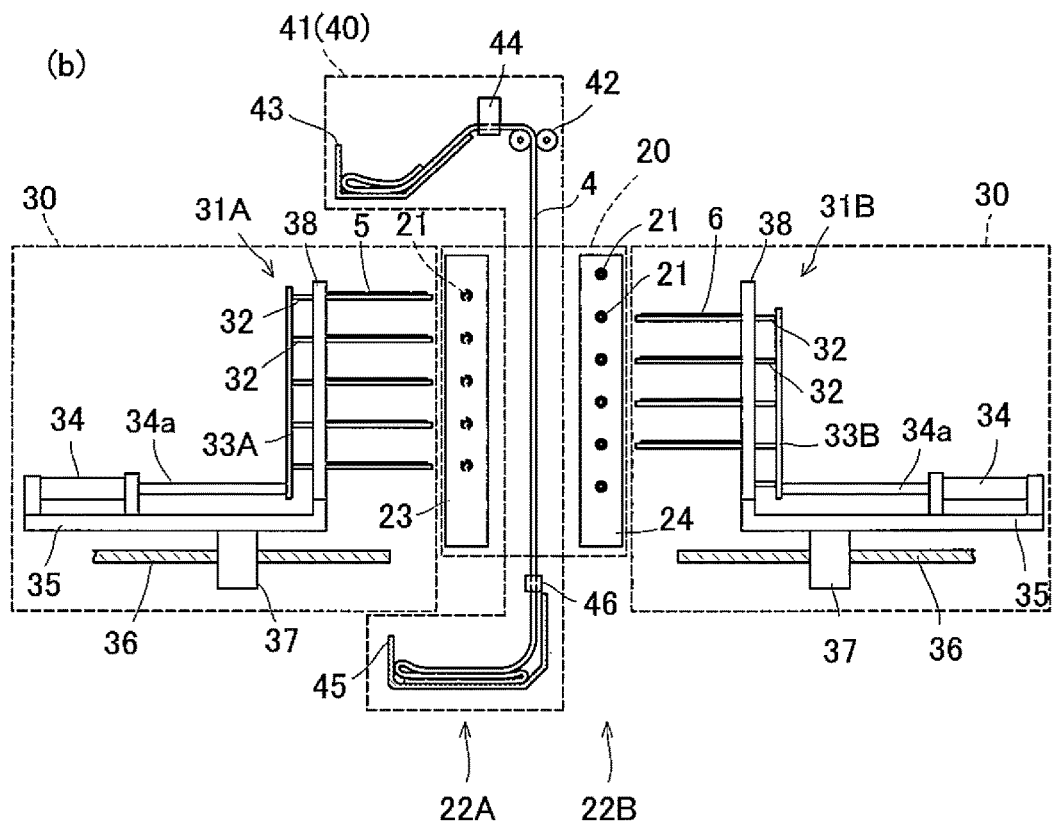

As shown in FIGS. 4(a), 4(b), the zigzag folding means 20 has a plurality of guide bars (guide members) 21 arranged zigzag in a vertical direction. When the separator 4 is disposed between one row 22A and another row 22B of the guide bars 21, the guide bars 21 are allowed to cross in a horizontal direction between the rows 22A and 22B to fold the separator 4 zigzag. These features will be described later in detail.

There are provided the guide bars 21 whose number is the same as, or larger than, the number of the positive and negative electrode plates 5, 6 supplied to the separator 4. The plurality of guide bars 21 are arranged, each in a horizontal posture, in the two rows 22A, 22B vertically on a platform (not shown). Also, the guide bars 21 are arranged zigzag between the rows 22A and 22B, namely, zigzag in the vertical direction. These guide bars 21 are supported in a cantilever manner by vertical frames 23, 24 provided for the rows 22A, 22B, respectively.

The zigzag folding means 20 also has a drive unit which crosses the guide bars 21 between the rows 22A and 22B to fold the separator 4 zigzag. This drive unit is constituted, for example, by a ball screw, a motor for rotating the ball screw, and so on. Since the drive unit thus composed of the ball screw, motor, etc. is an ordinary feeding means, its illustration is omitted.

The electrode plate insertion means 30 is equipped with a pair of electrode plate conveying members 31 (31A, 31B) disposed behind the respective rows 22A, 22B of the guide bars 21 constituting the zigzag folding means 20. Each electrode plate conveying member 31 has a plurality of electrode plate conveying trays 32 on which a predetermined number of the positive electrode plates 5 or the negative electrode plates 6 are placed. The electrode plate insertion means 30 moves these electrode plate conveying trays 32 into furrows 4a (see FIG. 2) formed in the separator 4 to insert the positive electrode plates 5 and the negative electrode plates 6 alternately into the respective furrows 4a.

In the present embodiment, the electrode plate insertion means 30 is provided with a first electrode plate conveying member (electrode plate conveying member for positive electrode plates) 31A for conveying the positive electrode plates 5, and a second electrode plate conveying member (electrode plate conveying member for negative electrode plates) 31B for conveying the negative electrode plates 6. The first electrode plate conveying member 31A has the same number of the electrode plate conveying trays 32 as the number of the positive electrode plates 5 necessary for the electrode plate group 3. The respective electrode plate conveying trays 32 of the first electrode plate conveying member 31A are arranged horizontally behind the guide bars 21 constituting the one row 22A, and have rear ends connected by a support frame 33A. Similarly, the second electrode plate conveying member 31B also has the same number of the electrode plate conveying trays 32 as the number of the negative electrode plates 6 necessary for the electrode plate group 3. The electrode plate conveying trays 32 of the second electrode plate conveying member 31B are arranged horizontally behind the guide bars 21 constituting the other row 22B, and have rear ends connected by a support frame 33B.

The support frames 33A, 33B are connected, respectively, to piston rods 34a of piston cylinder devices 34 capable of expansion and contraction in the conveying direction of the positive electrode plates 5 or the negative electrode plates 6. Each piston cylinder device 34 is installed on a reciprocating table 35 which can reciprocate in the conveying direction of the positive electrode plates 5 or the negative electrode plates 6.

Each reciprocating table 35 is adapted to be movable in the horizontal direction by a drive unit composed of a ball screw, etc. Concretely, each reciprocating table 35 is connected to a nut 37 screwed to a ball screw 36 which is a feed screw installed rotatably on the platform. The ball screw 36 is adapted to be rotated by a motor (not shown). When the ball screw 36 is rotated, the first and second electrode plate conveying members 31A, 31B are each moved toward or away from the separator 4.

Paired push members 38 to be brought into contact with edge parts of the separator 4 are provided on the right and left sides of the electrode plate conveying tray 32 (on both sides in a direction perpendicular to the moving direction of the electrode plate conveying tray 32). Concretely, the push members 38 are constituted as paired vertical bars to be contacted with the edge parts of the positive electrode plate 5 and the negative electrode plate 6 protruding from the right and left sides of each electrode plate conveying tray 32, and are attached to each reciprocating table 35.

The conveying means 40 is equipped with a holding/conveying member 41 for holding the separator 4 of a predetermined length supplied from the supply means 50 and conveying it to the zigzag folding means 20 (see FIG. 3). That is, the holding/conveying member 41 holds the separator 4 of the predetermined length and conveys it between the rows 22A and 22B of the guide bars 21. Each holding/conveying member 41 has a nip roller 42 which feeds the separator 4 supplied from the supply means 50 in a downward direction, and also holds the separator 4 while pinching it. On a side upward of the nip roller 42 (on a side facing the supply means 50), there are provided a first accommodation case 43 accommodating a part of the separator 4 upward of the nip roller 42, and a first guide member 44 for guiding the separator 4 from the nip roller 42 to the first accommodation case 43. The holding/conveying member 41 also has a second accommodation case 45 accommodating a lower end side of the separator 4, and a second guide member 46 for guiding the separator 4 to the second accommodation case 45, downward of the guide bars 21, with the separator 4 being moved within the zigzag folding means 20.

The supply means 50 for supplying the separator 4 to the conveying means 40 is provided independently of the zigzag folding means 20, as shown in FIG. 3. In the present embodiment, the supply means 50 is installed on each side of the zigzag folding means 20. In correspondence with these two supply means 50A and 50B, the conveying means 40 has two of the holding/conveying members, 41A, 41B, and each of the holding/conveying members 41A, 41B is adapted to be movable between the supply means 50A, 50B and the zigzag folding means 20.

Figure 5:
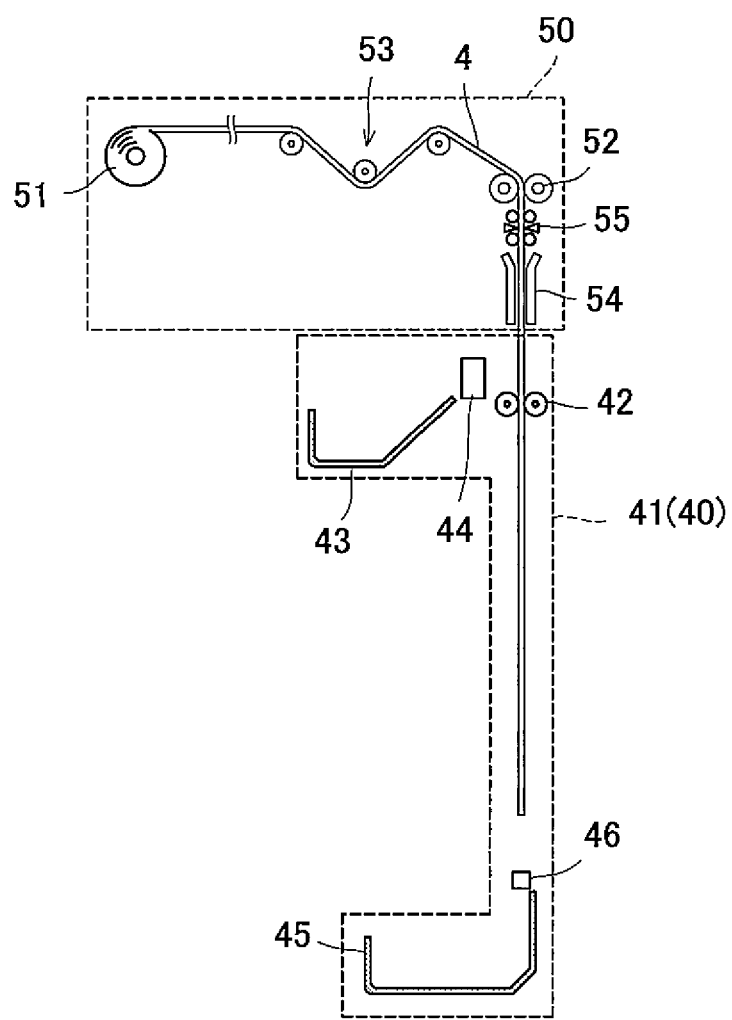
FIG. 5 is a schematic view showing the configuration of supply means according to Embodiment 1.

Each supply means 50, as shown in FIG. 5, is furnished with a roll 51 of the separator 4 wound up, and a conveying system 53 having a plurality of rollers including a conveying roller 52, and supplies the separator 4 paid out from the roll 51 to the conveying means 40 via the conveying system 53. The supply means 50 also has a direction control member 54, which is provided swingably to control the traveling direction of the separator 4, and a cutter 55 for cutting the separator 4, in the vicinity of a terminating part of the conveying system 53 beside the conveying means 40.

A method for producing the electrode plate group 3 by the production apparatus 10 of the above-described configuration will be described by reference to FIGS. 6 to 12(a), 12(b).

Figure 6:
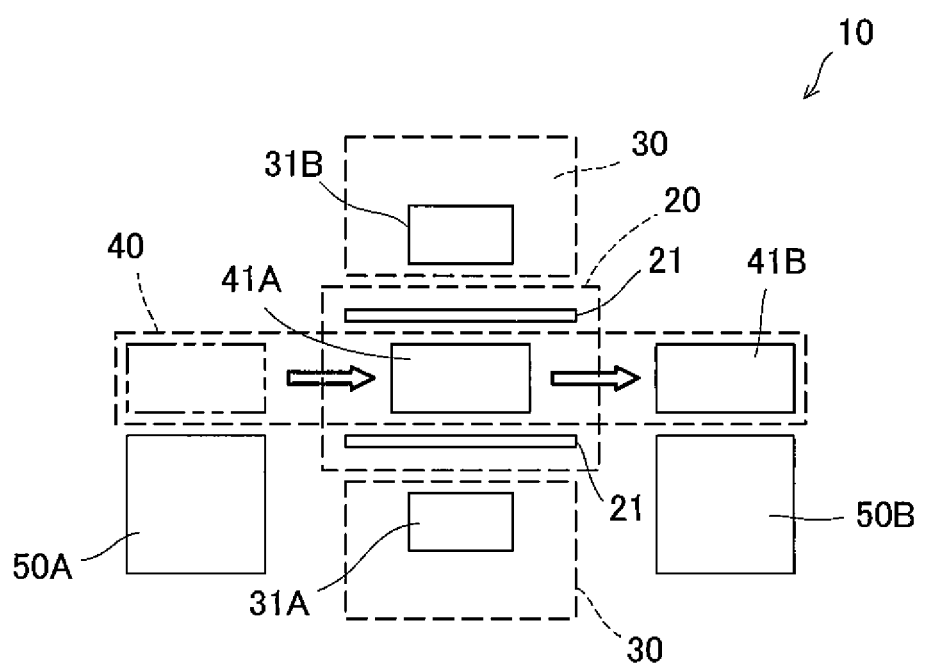
FIG. 6 is a schematic view showing a method for producing the electrode plate group using the production apparatus according to Embodiment 1.
Figure 7:
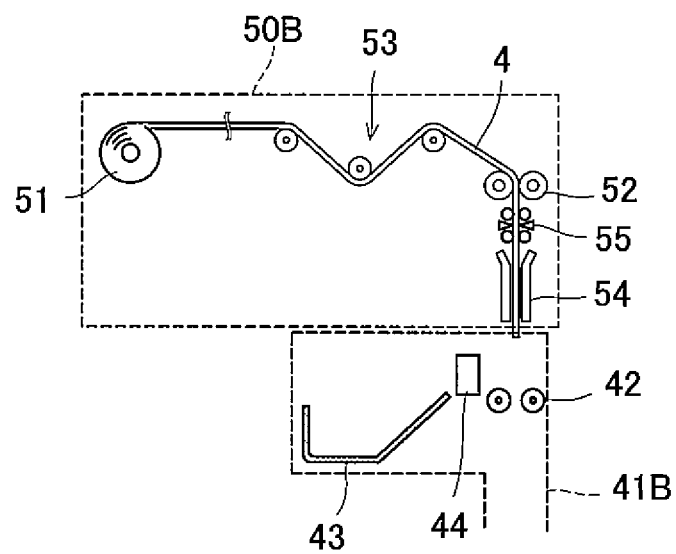
FIGS. 7(a), 7(b) are schematic views showing the method for producing the electrode plate group using the production apparatus according to Embodiment 1.
Figure 7:
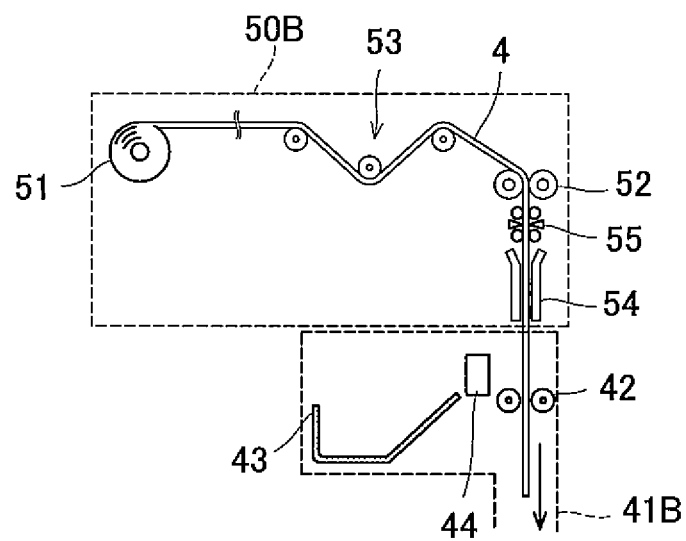

When the production apparatus 10 is actuated, the one holding/conveying member 41A supplied with the separator 4 from the supply means 50A and holding the separator 4 of a predetermined length is moved to the zigzag folding means 20, as shown in FIG. 6. Thus, the separator 4 is disposed between the rows 22A and 22B of the guide bars 21 arranged zigzag (see FIGS. 4(a), 4(b)).

Simultaneously with the movement of the holding/conveying member 41A, the other holding/conveying member 41B is moved from the zigzag folding means 20 to the supply means 50B. Then, the separator 4 is supplied from the supply means 50B to the holding/conveying member 41B, and the separator 4 of a predetermined length is held by the holding/conveying member 41B.

Concretely, as shown in FIG. 7(a), when the supply of the separator 4 from the supply means 50B to the holding/conveying member 41B is started, a leading end part of the separator 4 paid out from the conveying roller 52 is located near the direction control member 54 via the conveying system 53. That is, the moving direction of the separator 4 is controlled by the direction of the direction control member 54. At the start of supply of the separator 4, the direction control member 54 points toward the nip roller 42 of the holding/conveying member 41B. Hence, the separator 4 is first passed through the nip roller 42 and supplied downwardly in the holding/conveying member 41B, as shown in FIG. 7(b). At this time, the nip roller 42 is in an open state.

Figure 8:
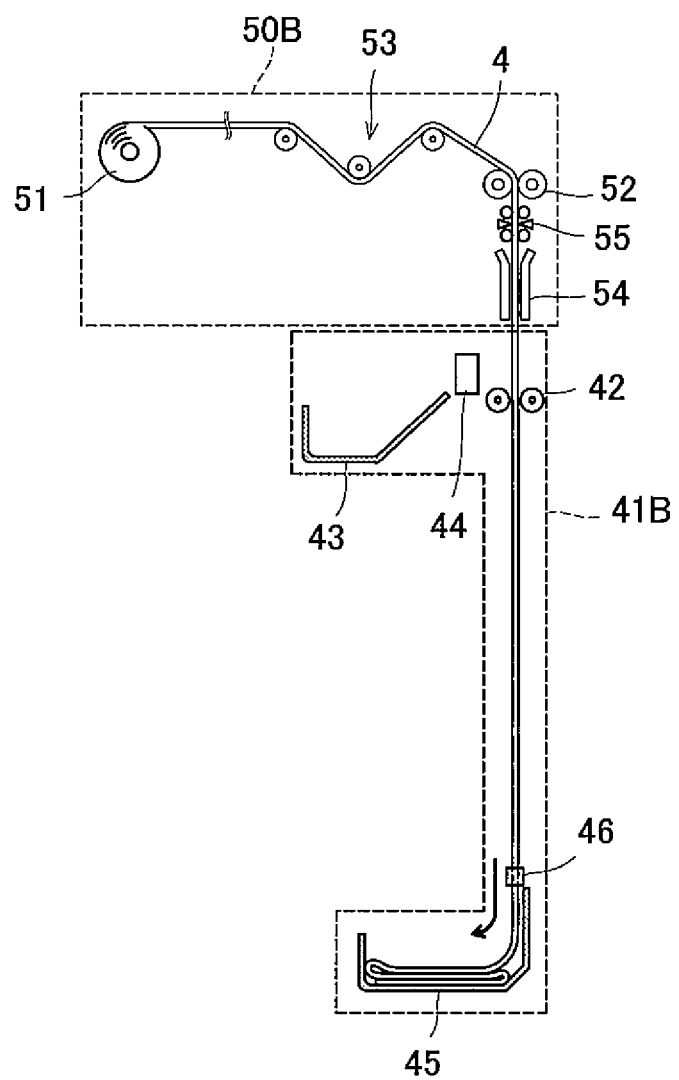
FIG. 8 is a schematic view showing the method for producing the electrode plate group using the production apparatus according to Embodiment 1.
Figure 9:
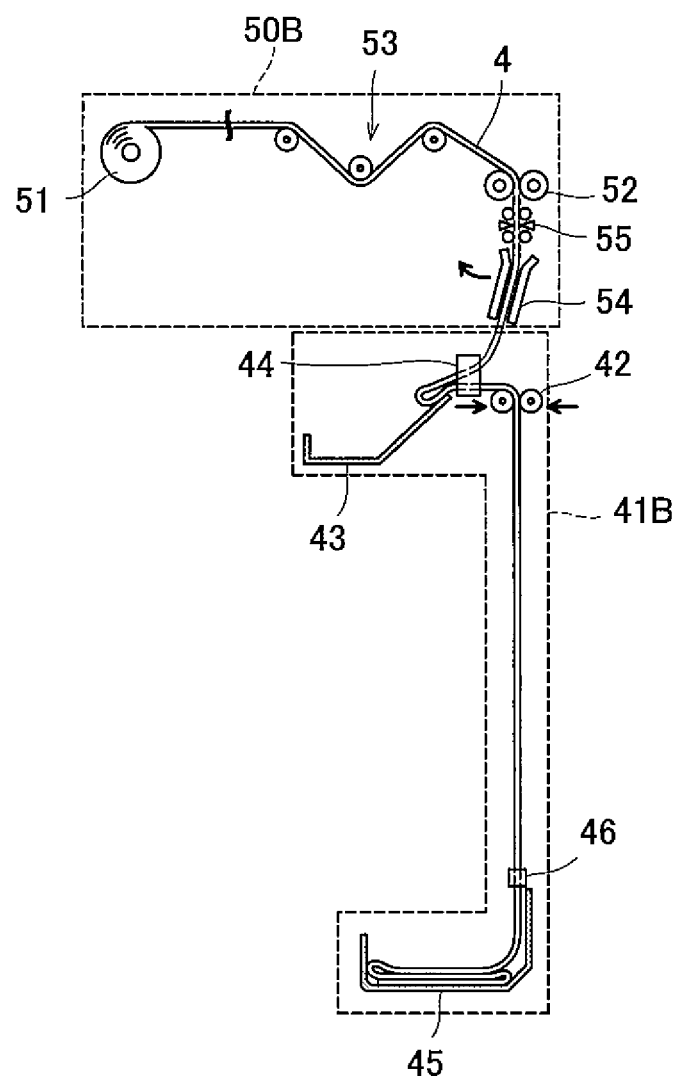
FIG. 9 is a schematic view showing the method for producing the electrode plate group using the production apparatus according to Embodiment 1.

The leading end side (lower end side) of the separator 4 enters the interior of the second accommodation case 45 via the second guide member 46, as shown in FIG. 8. At a stage where the separator 4 of a predetermined length is accommodated inside the second accommodation case 45, the nip roller 42 is closed, and the separator 4 is held by the nip roller 42. As a result, the supply of the separator 4 toward the second accommodation case 45 farther from the nip roller 42 is stopped, and the supply of the separator 4 is continued only above the nip roller 42. As shown in FIG. 9, at the same time that the nip roller 42 is closed, the direction control member 54 is driven. That is, the direction control member 54 is swung so as to be headed toward the first guide member 44.

Figure 10:
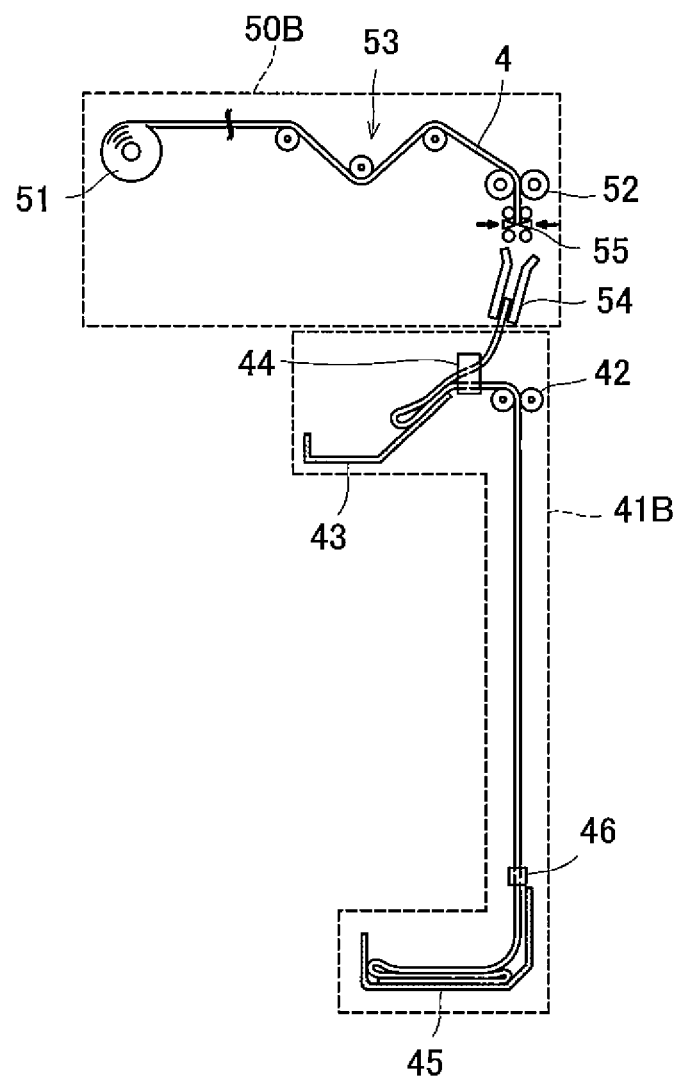
FIG. 10 is a schematic view showing the method for producing the electrode plate group using the production apparatus according to Embodiment 1.
Figure 11:
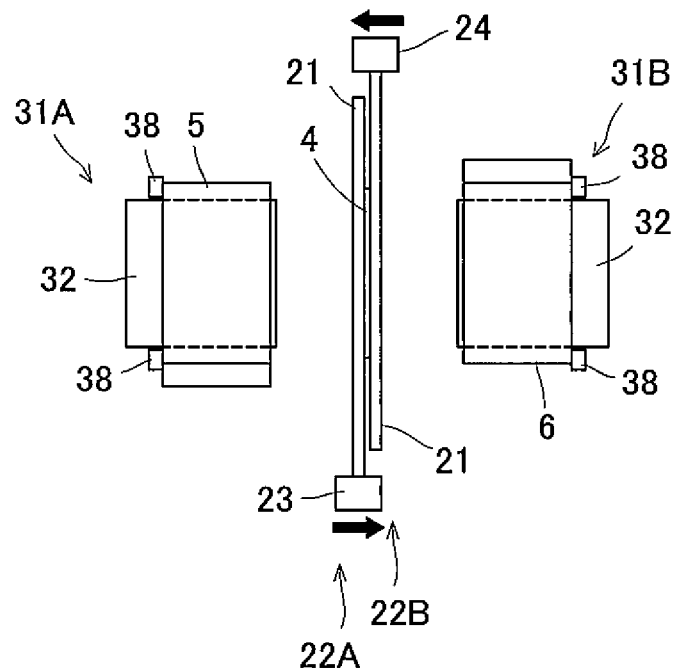
FIGS. 11(a), 11(b) are schematic views showing the method for producing the electrode plate group using the production apparatus according to Embodiment 1.
Figure 11:
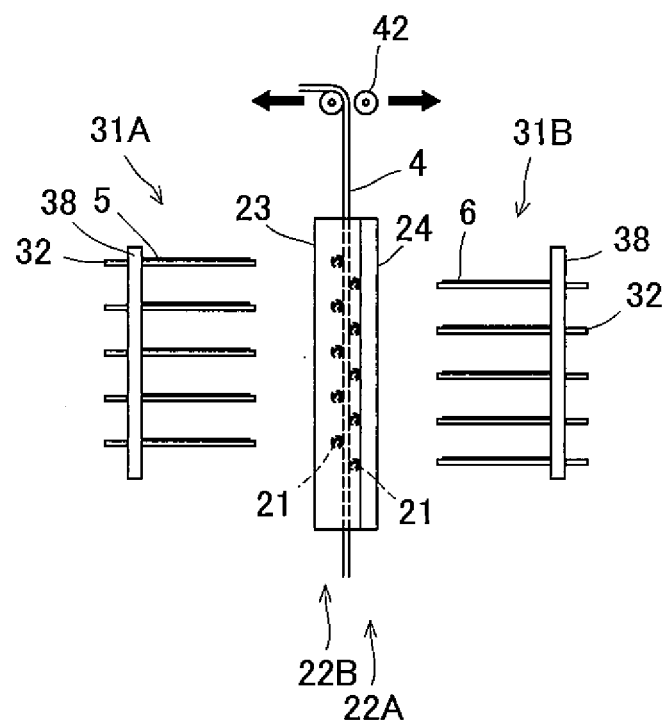
Figure 12:
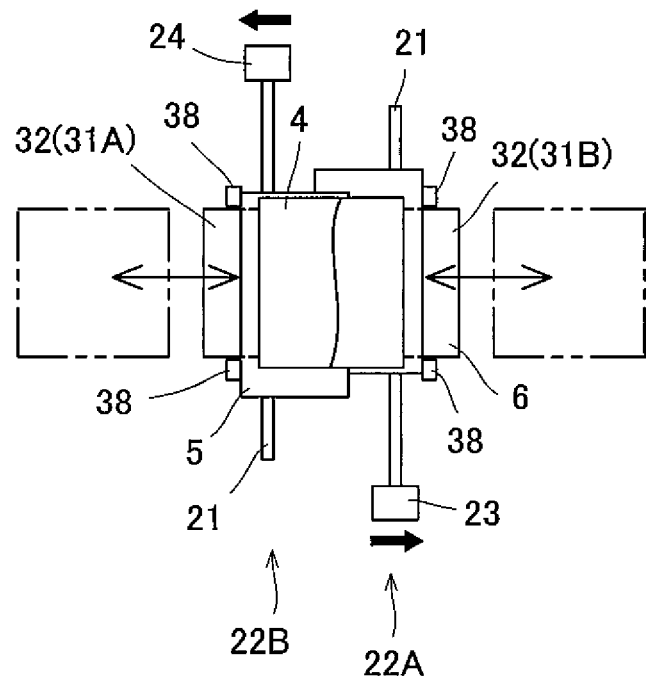
FIGS. 12(a), 12(b) are schematic views showing the method for producing the electrode plate group using the production apparatus according to Embodiment 1.
Figure 12:
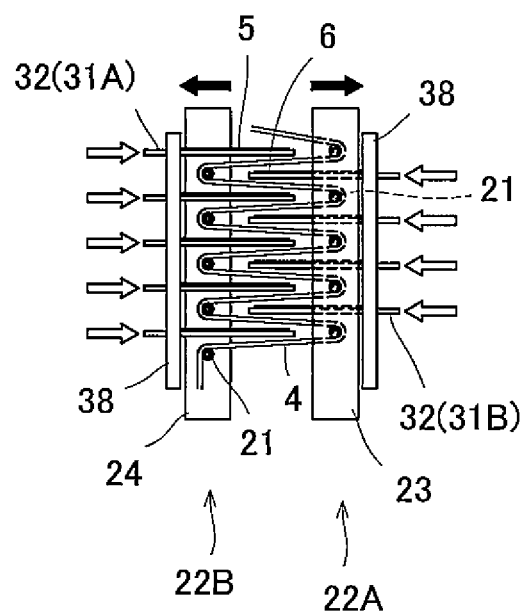

Since the separator 4 is held by the nip roller 42, slack occurs in a part of the separator 4 located above the nip roller 42. At this time, the direction control member 54 faces toward the first guide member 44. Thus, as shown in FIG. 10, a slack part of the separator 4 spreads into the first accommodation case 43 via the first guide member 44. After the nip roller 42 is closed, moreover, the separator 4 is cut using the cutter 55 at a time when a predetermined length of the separator 4 has been supplied. As a result, the upper end side of the separator 4 is accommodated within the first accommodation case 43 (see FIG. 4(b)). When the separator 4 is cut with the cutter 55, the upper end side of the separator 4 is admitted into the first accommodation case 43 under its own weight, but the movement of the separator 4 may be assisted, for example, by an air blow.

The cut-off separator 4 is nipped by the nip roller 42, and thus is held by the holding/conveying member 41B without being moved. That is, the separator 4 is supplied from the supply means 50B to the holding/conveying member 41B, whereby a predetermined length of the separator 4 is held by the holding/conveying member 41B.

Let us return to an explanation for the zigzag folding means 20. When the separator 4 of the predetermined length is disposed between the rows 22A and 22B of the zigzag-folded guide bars 21 by the holding/conveying member 41A, as shown in FIGS. 11(a), 11(b), the rows 22A and 22B of the guide bars 21 are each moved horizontally toward the separator 4, and once stopped at a time when each guide bar 21 contacts the separator 4 (separator arrangement step). In this state, the nip roller 42 is opened to release the pinching of the separator 4 (FIG. 11(b)). That is, the separator 4 comes into a substantially tension-free state. At this time, a plurality of the guide bars 21 are in contact with the separator 4 as mentioned above, so that the separator 4 is held between the guide bars 21 without dropping. In other words, the separator 4 is held between the guide bars 21, with its opposite end sides being movable.

When the separator 4 enters the tension-free state, the horizontal movement of each guide member 21 is resumed. As shown in FIGS. 12(a), 12(b), the guide bars 21 are crossed between the rows 22A and 22B. In accordance with this movement of the guide bars 21, the separator 4 is pulled into the center, namely, the zigzag folding means 20, from inside the first and second accommodation cases 43, 45. By this means, the separator 4 is zigzag-folded, and a necessary number of the furrows 4a for a single electrode plate group 3 are simultaneously formed in the separator 4. That is, the separator 4 is zigzag-folded by pushing the separator 4 with the guide bars 21.

As noted above, the guide bars 21 are moved, with the separator 4 being in a tension-free state, to form the furrows 4a in the separator 4, so that the guide bars 21 can be moved at a relatively high speed.

It has been conventional practice, for example, to clamp a leading end part of the separator, and move the guide bars, while supplying the separator from the roll, to form the furrows in the separator. This means that in forming the furrows in the separator, strong tension has been imposed on the separator. When the guide bars are moved at a high speed, therefore, the separator impedes the movement of the guide bars without being able to follow the movement of the guide bars. Thus, there has been a possibility, for example, for the deformation or cracking of the guide bars.

With the present invention, on the other hand, the zigzag step of moving the guide bars 21 to form the furrows 4a in the separator 4 is started after bringing the separator 4 into a tension-free state. That is, the opposite end sides of the separator 4 accommodated in the first and second accommodation cases 43, 45 are brought into a movable state, whereafter the guide bars 21 are moved to form the furrows 4a in the separator 4. Thus, even when the guide bars 21 are moved at a relatively high speed, the separator 4 can follow the movement of the guide bars 21. Hence, an improvement in tact time can be achieved, without occurrence of cracking of the guide bars 21, for example.

Moreover, the guide bars 21 are moved for each of the rows 22A and 22B in the horizontal direction and, at the same time, the first and second electrode plate conveying members 31A, 31B and the push members 38 are also moved horizontally toward the separator 4. That is, the reciprocating tables 35 are moved according to rotations of the ball screws 36, whereby the first and second electrode plate conveying members 31A, 31B and the push members 38 are moved toward the separator 4 (see FIGS. 4(a), 4(b)). As a result, the positive electrode plates 5 loaded beforehand on the respective electrode plate conveying trays 32 of the first electrode plate conveying member 31A and the negative electrode plates 6 loaded beforehand on the respective electrode plate conveying trays 32 of the second electrode plate conveying member 31B are inserted alternately into the respective furrows 4a of the separator 4 folded zigzag. Thus, a multilayer body comprising the positive electrode plates 5 and the negative electrode plates 6 alternately superposed via the separator 4 is formed (multilayer body formation step).

Then, the guide bars 21 are withdrawn from the interior of each furrow 4a of the separator 4 (withdrawal step). Then, the first and second electrode plate conveying members 31A, 31B are moved away from the separator 4, with the push members 38 being left behind. Simultaneously, the resulting multilayer body having the positive electrode plates 5 and the negative electrode plates 6 stacked alternately via the separator 4 is pressed in the stacking direction of the positive electrode plates 5 and the negative electrode plates 6 by a predetermined press means. That is, with the multilayer body being pressed in the stacking direction of the positive electrode plates 5 and the negative electrode plates 6, the first and second electrode plate conveying members 31A, 31B are retreated out of the furrows 4a and returned to the original positions (indicated by dashed double-dotted lines in FIG. 12(a)) as a result of contracting motions of the piston cylinder devices 34. The push members 38 retain at the advanced position, so that the positive electrode plates 5 and the negative electrode plates 6 are retrained from movement by the push members 38 and are left in the furrows 4a of the separator 4.

Consequently, there is formed a flat multilayer body having the separator 4, the positive electrode plates 5 and the negative electrode plates 6 stacked alternately. After the flat multilayer body is formed, the separator 4 is wrapped around the flat multilayer body, and a surplus of the separator 4 is cut off to form the electrode plate group 3. Further, this electrode plate group 3 is accommodated in the square case 2 for the battery to form the square battery 1.

With the present embodiment, as mentioned above, the guide bars 21 are crossed between the rows 22A and 22B to fold the separator 4 zigzag and, simultaneously, the electrode plate conveying members 31 are moved. By this procedure, it becomes possible to insert the positive electrode plates 5 and the negative electrode plates 6 into the furrows 4a of the separator 4 while folding the separator 4 zigzag, and tact time becomes even shorter. It goes without saying that, if necessary, the electrode plate conveying members 31 may be moved after zigzag folding of the separator 4 by the guide bars 21. Furthermore, the positive electrode plates 5 or the negative electrode plates 6 are inserted batchwise into the furrows 4a of the separator 4, whereby the positional accuracy of the positive electrode plates 5, the negative electrode plates 6, and the separator 4 can be increased.

Besides, during the formation of the electrode plate group 3 by use of the separator 4 supplied from the supply means 50A, the separator 4 is supplied from the supply means 50B to the holding/conveying member 41B of the conveying means 40, as stated above. That is, not later than the pressing step of pressing the multilayer body having the positive electrode plates 5 and the negative electrode plates 6 superposed alternately, i.e., the step performed for production of an immediately preceding electrode plate group 3, the paying-out step of paying out the separator 4 of a predetermined length from the roll 51, and the cutting step of cutting the separator 4 with the cutter 55 are completed as steps for producing a following electrode plate group 3. After the production of the electrode plate group 3 is finished as mentioned above, therefore, the holding/conveying member 41A is moved to the supply means 50A, and also the holding/conveying member 41B is moved to the zigzag folding means 20. In this manner, production of a new electrode plate group 3 is started in a relatively short time.

Embodiment 2

Figure 13:
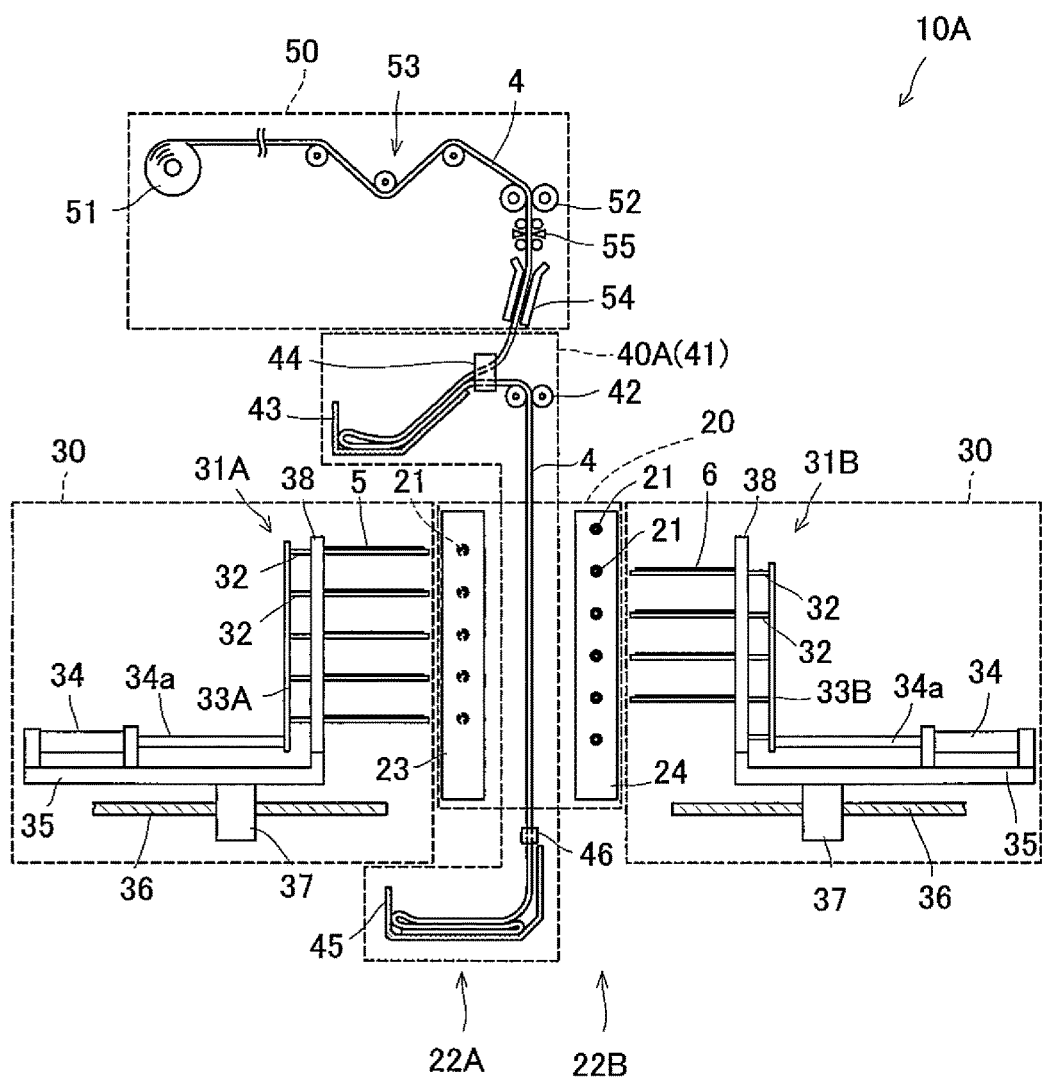
FIG. 13 is a schematic view showing an apparatus for producing an electrode plate group according to Embodiment 2.

FIG. 13 is a schematic view showing an apparatus for producing an electrode plate group according to Embodiment 2. The same members as those shown above are assigned the same numerals as their numerals, and duplicate explanations will be omitted.

A production apparatus 10A according to the present embodiment, as shown in FIG. 13, is equipped with a single supply means 50 for a single zigzag folding means 20 and, in correspondence with the single supply means 50, a conveying means 40A also has a single holding/conveying member 41. The configuration of the holding/conveying member 41 is the same as that in Embodiment 1, but is different from the one in Embodiment 1 in that the holding/conveying member 41 is fixed at a position opposing the zigzag folding means 20 and is not mobile.

In such a production apparatus 10A as well, the separator 4 is supplied to the holding/conveying member 41 and held thereby by the same procedure as in Embodiment 1 (see FIGS. 7(a), 7(b) to FIG. 9). On this occasion, the amount of the separator 4 paid out is rendered larger than in Embodiment 1 and, as shown in FIG. 13, the separator 4 is brought into a sufficiently slack state within a first accommodation case 43. Then, as in Embodiment 1, furrows 4a are formed in the separator 4, and also the positive electrode plates 5 or the negative electrode plates 6 are inserted into the furrows 4a (see FIG. 10 and FIGS. 11(a), 11(b)). At this time, the separator 4 has not been cut to a predetermined length, but is in a sufficiently slack state within the first accommodation case 43. Thus, in the present embodiment as well, after the separator 4 is put in a tension-free state, the separator 4 is zigzag-folded by a plurality of guide bars 21, whereby a necessary number of the furrows 4a for a single electrode plate group 3 are simultaneously formed in the separator 4. Hence, an improvement in tact time can be achieved, without occurrence of cracking of the guide bars 21, for example.

Then, after the guide bars 21 are withdrawn from the interior of each furrow 4a of the separator 4, the separator 4 is pressed to form a flat multilayer body. In the present embodiment, after the flat multilayer body is formed in this manner, the separator 4 is cut to a necessary length with the cutter 55, and the separator 4 cut to the predetermined length is wrapped around the flat multilayer body, whereby an electrode plate group 3 is formed. Further, the electrode plate group 3 is accommodated inside a case 2 for a battery to form a square battery 1.

As in the present embodiment, after formation of the flat multilayer body, the separator 4 is cut, whereby the separator 4 can be give a more appropriate length. For example, if the separator 4 is longer than required, at the time of cutting the separator 4, the separator 4 is rewound, and cut to give an appropriate length. Thus, waste of the separator 4 can be minimized to reduce manufacturing costs.

Embodiment 3

Figure 14:
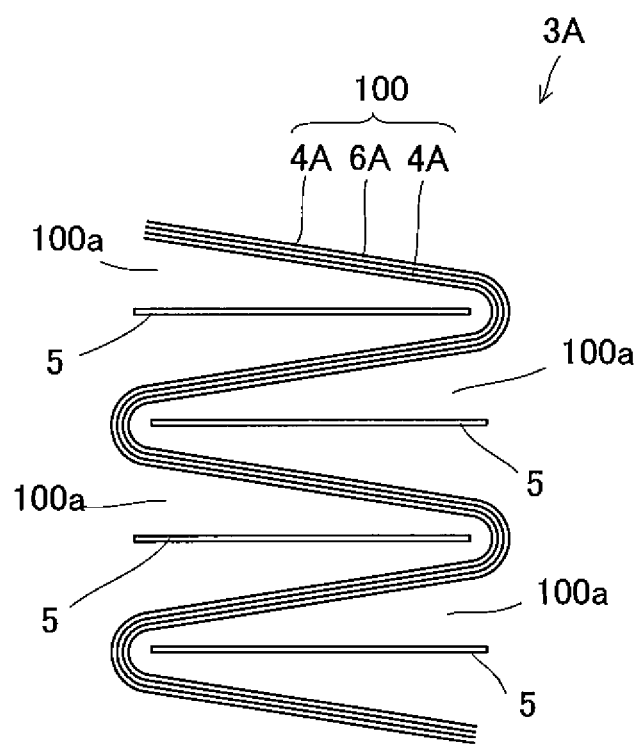
FIG. 14 is a schematic view showing an electrode plate group according to Embodiment 3.
Figure 15:
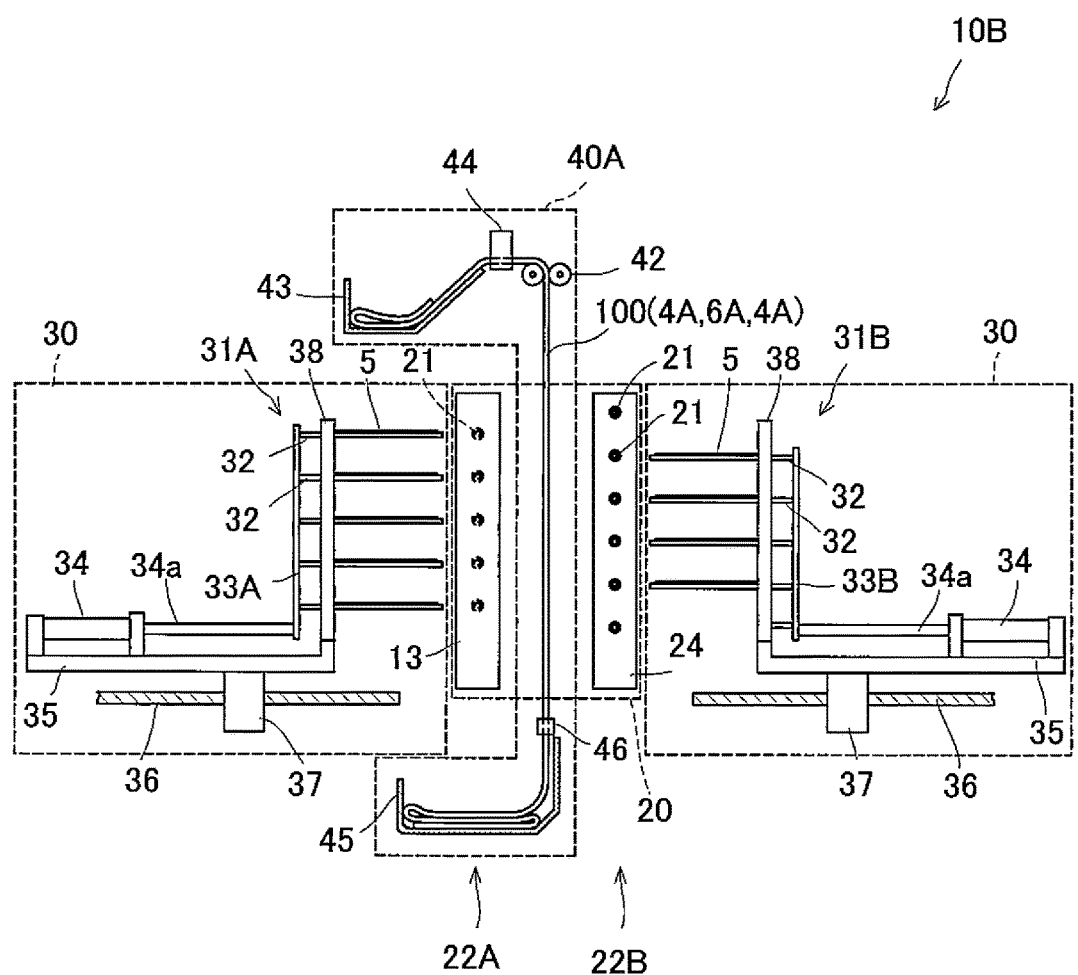
FIG. 15 is a schematic view showing an apparatus for producing the electrode plate group according to Embodiment 3.

FIG. 14 is a schematic view showing an electrode plate group according to Embodiment 3. FIG. 15 is a schematic view showing a production apparatus according to Embodiment 3. The same members as those shown above are assigned the same numerals as their numerals, and duplicate explanations will be omitted.

As shown in FIG. 14, an electrode plate group 3A according to Embodiment 3 is constituted as a flat multilayer body including a zigzag-folded continuous superposed body 100, and positive electrode plates 5 inserted into furrows 100a of the superposed body 100. The superposed body 100 is a laminate comprising a negative electrode plate 6A sandwiched between two separators 4A. Thus, the positive electrode plate 5 inserted into each furrow 100a of the superposed body 100 faces the negative electrode plate 6A via the separator 4A.

In the above-mentioned configuration of the present embodiment as well, as in Embodiment 1, the positive electrode plates 5 and the negative electrode plate 6A are provided with lead parts 5a and 6a protruding from the separators 4A in directions opposite to each other (see FIG. 2). The lead parts 5a, 6a of the respective electrodes are bundled, and connected, respectively, to a positive electrode terminal and a negative electrode terminal (not shown) of a square case 2 (see FIG. 1).

A production apparatus 10B for producing the above electrode plate group 3A is in a configuration having zigzag folding means 20, electrode plate insertion means 30, conveying means 40, and supply means 50 (see FIG. 3), as in Embodiment 1. The superposed body 100 is supplied from the supply means 50 and, as shown in FIG. 15, the superposed body 100 is disposed between rows 22A and 22B of guide bars 21 of the zigzag folding means 20. Moreover, each of first and second electrode plate conveying members 31A, 31B is adapted to convey the positive electrode plates 5 into the furrows 100a of the superposed body 100. Except for these features, the production apparatus 10B according to Embodiment 3 is of the same configuration as that of the production apparatus 10 according to Embodiment 1.

With the production apparatus 10B according to Embodiment 3 described above, it suffices to form in the superposed body 100 the furrows 100a into which only the positive electrode plates 5 are inserted. Thus, in producing the electrode plate group 3A of the same performance as that of the electrode plate group 3 of Embodiment 1, it is sufficient for the number of the furrows 100a of the superposed body 100 to be a half of the number in Embodiment 1. Thus, the numbers of the guide bars 21 and electrode plate conveying trays 32 can also be decreased to nearly a half and, by extension, tact time can be shortened further.

OTHER EMBODIMENTS

The present invention has been described above in regard to its embodiments, but it is to be noted that the present invention is in way limited to these embodiments. The present invention can be changed and modified, as appropriate, without departing from its gist.

In the aforementioned Embodiment 1, for example, the configuration of the control device having the two supply means is exemplified. Needless to say, however, there may be at least one supply means. That is, it is permissible for the one supply means to supply the separator alternately to the two holding/conveying members. Moreover, the configuration of the conveying means having the two holding/conveying members is exemplified, but the conveying means may be provided with three or more of the holding/conveying members.

In the above-mentioned embodiments, the furrows are formed in the separator by the plurality of guide members (guide bars). However, the electrode plate conveying trays constituting the electrode plate insertion means may concurrently play the role of the guide members. That is, the electrode plate conveying trays may be pressed against the separator to form furrows in the separator, and also, the positive electrode plates or negative electrode plates placed on the electrode plate conveying trays may be inserted into the furrows.

In the above embodiments, moreover, the lithium ion secondary battery is exemplified as an example of the square battery. However, the present invention is also applicable to batteries other than the lithium ion secondary battery, and to primary batteries, etc. Furthermore, in the above embodiments, when the guide bars are crossed between the rows, both rows are moved. However, the same zigzag folding can be achieved, even if the guide bars in the one row remain stationary, and the guide bars in the other row are moved. If such features are adopted, the number of the drive units for moving the rows of the guide bars can be decreased, and the costs can be reduced. Besides, the numbers of the guide bars and the electrode plate conveying trays can be increased or decreased, and are not limited to those specified in the above embodiments.

EXPLANATIONS OF LETTERS OR NUMERALS

1 Square battery
2 Square case
3 Electrode plate group
4 Separator
4a Furrow
5 Positive electrode plate
6 Negative electrode plate
5a, 6a Lead part
10 Production apparatus
20 Zigzag folding means
21 Guide bar
23, 24 Vertical frame
30 Electrode plate insertion means
31 Electrode plate conveying member
32 Electrode plate conveying tray
33 Support frame
34 Piston cylinder device
35 Reciprocating table
38 Push member
40 Conveying means
41 Holding/conveying member
42 Nip roller
43 First accommodation case
44 First guide member
45 Second accommodation case
46 Second guide member
50 Supply means 51 Roll
52 Conveying roller
53 Conveying system
54 Direction control member
55 Cutter

The invention claimed is:

1. A method for producing a secondary battery, comprising:
a folding step of using a plurality of guide members to fold a body comprising a separator into a zigzag shape to form a zigzag-folded body comprising a separator,
following the folding step, inserting positive electrode plates into respective furrows of the zigzag-folded body comprising a separator to form a multilayer body, the multilayer body comprising the positive electrode plates and at least one negative electrode plate that are superposed alternately via the separator;
a withdrawal step of withdrawing the guide members from inside the respective furrows of the body comprising a separator; and
a pressing step of pressing the multilayer body in a direction in which the positive electrode plates and the at least one negative electrode plate are stacked,
wherein the folding step is performed after the body comprising a separator is brought into a tension-free state and held between the guide members with opposite end sides of the body being movable.

2. The method for producing a secondary battery of claim 1, wherein the body comprising a separator is a superposed body, the at least one negative electrode plate being a negative electrode plate sandwiched between two separating members in the body comprising a separator.

3. The method for producing a secondary battery according to claim 2, further comprising:
a separator arrangement step of arranging the plurality of guide members zigzag in a vertical direction, and disposing the superposed body between one row and another row of the guide members,
wherein the folding step is performed by crossing the guide members in a horizontal direction between the rows.

4. The method for producing a secondary battery according to claim 3,
wherein the separator arrangement step disposes the superposed body between the one row and the other row of the guide members, and then brings the superposed body into a tension-free state, while contacting the guide members in each row with the superposed body to restrain movement of the separator or the superposed body.

5. The method for producing a secondary battery according to claim 2, further comprising:
a cutting step of cutting the superposed body to a predetermined length.

6. The method for producing a secondary battery according to claim 5,
wherein the cutting step is performed after the pressing step.

7. The method for producing a secondary battery according to claim 5,
wherein the cutting step is performed before the folding step.

8. The method for producing a secondary battery according to claim 7, further comprising:
before the cutting step, a paying-out step of paying out the superposed body of the predetermined length from a roll of the superposed body wound up,
wherein the paying-out step and the cutting step are performed not later than the pressing step which is performed for producing an immediately preceding secondary battery.

9. The method for producing a secondary battery of claim 1,
wherein the at least one negative electrode plate comprises a plurality of negative electrode plates, and
wherein the folding step further comprises inserting the plurality of negative electrode plates into respective furrows of the separator.

10. The method for producing a secondary battery according to claim 9, further comprising:
a separator arrangement step of arranging the plurality of guide members zigzag in a vertical direction, and disposing the separator between one row and another row of the guide members,
wherein the folding step is performed by crossing the guide members in a horizontal direction between the rows.

11. The method for producing a secondary battery according to claim 10,
wherein the separator arrangement step disposes the separator between the one row and the other row of the guide members, and then brings the separator into a tension-free state, while contacting the guide members in each row with the separator to restrain movement of the separator.

12. The method for producing a secondary battery of claim 11, wherein at least one of an upper end side portion of the separator and a lower end side portion of the separator is mounted on a mounting member.

13. The method for producing a secondary battery of claim 12, wherein the mounting member comprises an upper side mounting member and a lower side mounting member, and the upper end side portion of the separator is mounted on the upper side mounting member and the lower end side portion of the separator is mounted on the lower side mounting member.

14. The method for producing a secondary battery of claim 13, wherein the lower side of the separator is cut in a nipping state by a nip member, and while contacting the guide members in each row with the separator, the separator is released from the nipping state.

15. The method for producing a secondary battery according to claim 9, further comprising:
a cutting step of cutting the separator to a predetermined length.

16. The method for producing a secondary battery according to claim 15,
wherein the cutting step is performed after the pressing step.

17. The method for producing a secondary battery according to claim 15,
wherein the cutting step is performed before the folding step.

18. The method for producing a secondary battery according to claim 17, further comprising:
before the cutting step, a paying-out step of paying out the separator of the predetermined length from a roll of the separator wound up,
wherein the paying-out step and the cutting step are performed not later than the pressing step which is performed for producing an immediately preceding secondary battery.

19. The method for producing a secondary battery of claim 9, wherein at least one of an upper end side portion of the body and a lower end side portion of the body is mounted on a mounting member.

20. The method for producing a secondary battery of claim 19, wherein the mounting member comprises an upper side mounting member and a lower side mounting member, and the upper end side portion of the separator is mounted on the upper side mounting member and the lower end side portion of the separator is mounted on the lower side mounting member.

21. The method for producing a secondary battery of claim 20, wherein the lower side of the separator is cut in a nipping state by a nip member, and while contacting the guide members in each row with the separator, the separator is released from the nipping state.

* * * * *